April 18, 1939.  H. A. MANTZ  2,155,233

CONTROL SYSTEM

Filed Jan. 25, 1932  3 Sheets-Sheet 1

Inventor:
Harold A. Mantz
By Brown, Jackson, Boettcher, Dienner
Attys.

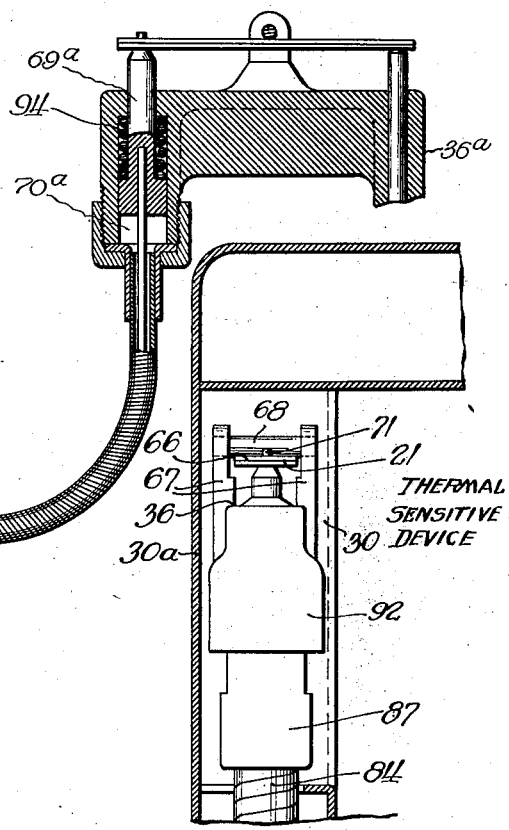
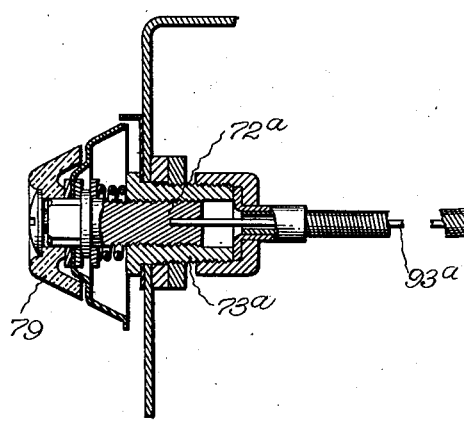
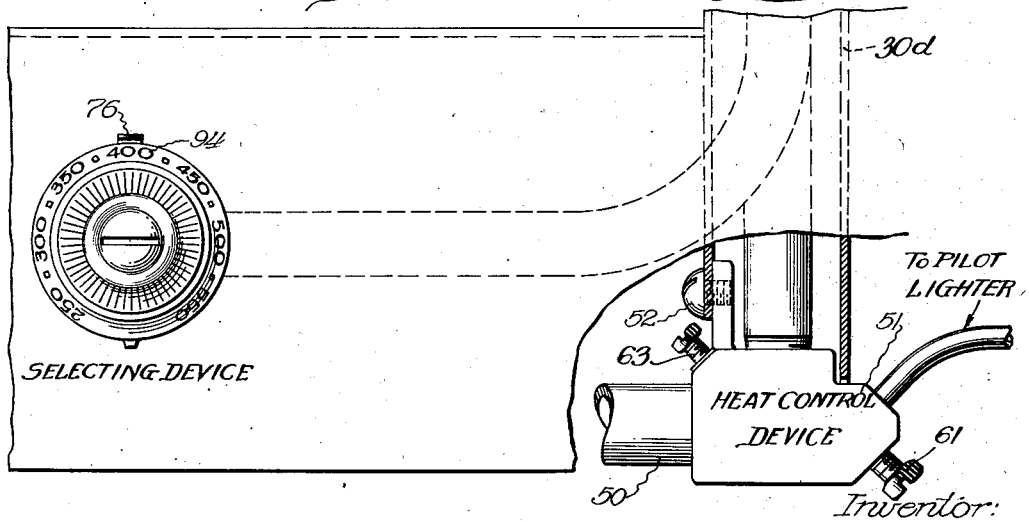

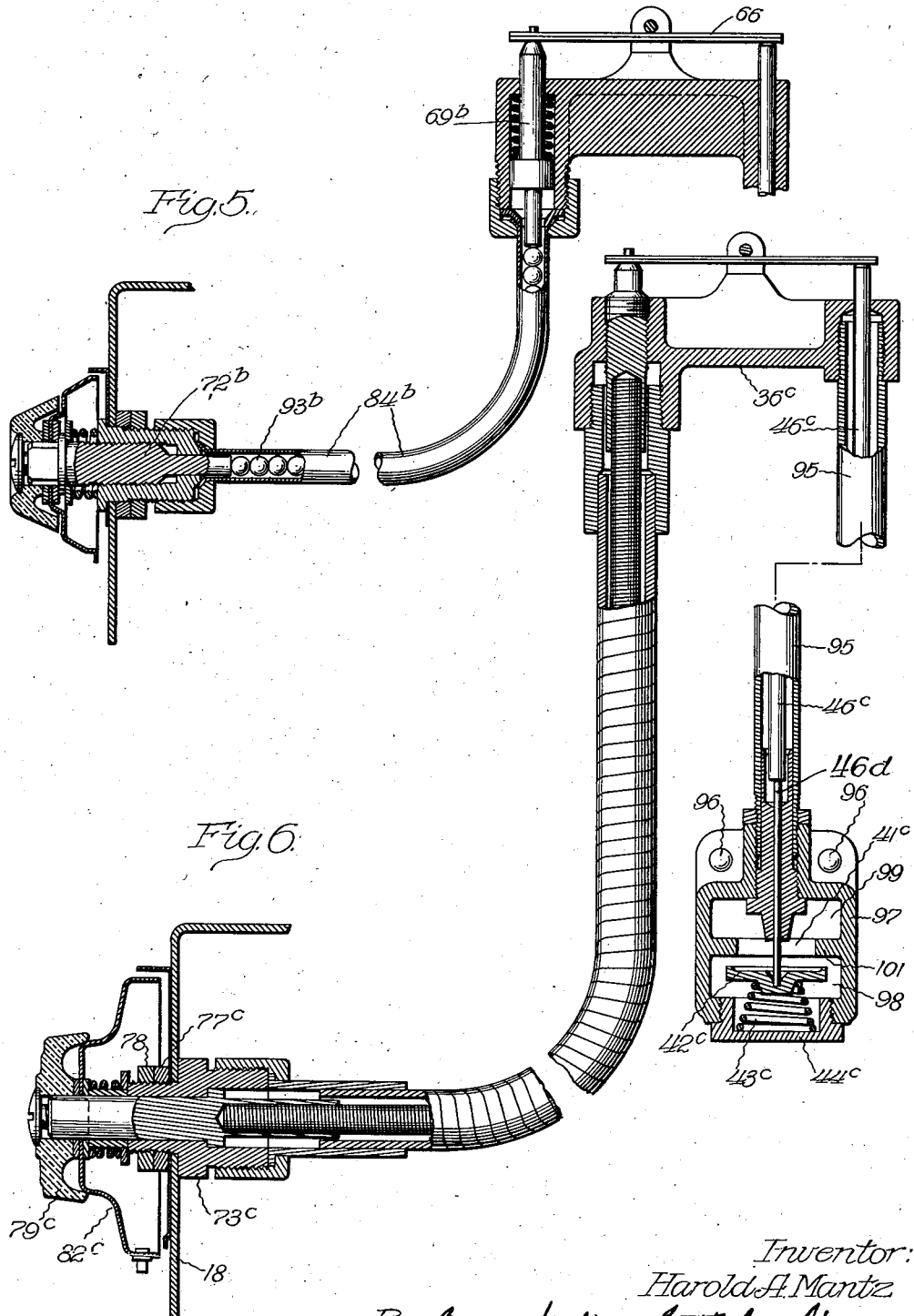

Patented Apr. 18, 1939

2,155,233

UNITED STATES PATENT OFFICE 2,155,233

CONTROL SYSTEM

Harold A. Mantz, Milwaukee, Wis., assignor to Milwaukee Gas Specialty Company, Milwaukee, Wis., a corporation of Wisconsin Application January 25, 1932, Serial No. 588,688

3 Claims. (Cl. 236—15)

This invention relates, broadly, to temperature control devices, and more particularly to temperature control devices adapted for use in connection with ovens and the like, although not limited to this particular use.

I have considered the problem of controlling the temperature of ovens, space heaters and the like, and have observed that the installation of such devices usually entails making unsightly openings in the walls of the oven or enclosure and necessitates the use of pipes, control devices, and the like outside of the oven where they interfere with the operation of the stove and the oven and present an unsightly appearance. These devices are usually complicated and expensive to install and maintain.

I have observed further that in the devices of this sort heretofore provided the free warping properties of the thermal sensitive member frequently are interfered with and that it has been difficult to obtain the desired positioning of the respective parts.

I have conceived of a temperature regulating device which need not project outside the oven above the stove nor need it project in the space in front of the oven. It is readily installed and maintained, and the device is simple, reliable and inexpensive.

It is, therefore, a general object of my invention to provide a convenient, inexpensive, easily installed, dependable temperature regulating and control mechanism.

More particularly it is an object of the present invention to provide a temperature control device comprising a thermostat, a fuel feed control mechanism operatively connected to the thermostat, a regulating means spaced at a distance from the feed control mechanism, and an operative connection between the regulating means and the feed control mechanism.

Another object of the invention is to provide in a device sensitive to changes in temperature in an oven or the like, a fuel flow control means located at a distance from the temperature sensitive device, and a device in which control of the temperature of the oven may be effected at a distance from these last named devices.

Another important object of the invention is to provide a device in which the connection between the temperature responsive device and the regulating mechanism may be carried around corners or other obstructions or located in irregular channels.

Another object of the invention is to provide a device which may be hidden from view and which will not interfere with the operation or use of the stove, oven or other heating device.

Another object of the invention is to provide, in a system of the above character, a thermostat which may be mounted in proper position within the oven or between the walls of a double walled oven and a regulating or selecting mechanism which may be located at a distance therefrom. A valve structure or other controlling device under the control of the selecting means and the thermal sensitive means is adapted to be spaced away from the thermostat and preferably in proximity to the heating means or its supply.

Another object is to employ the thermal sensitive member in such a way that it will be positioned and supported for functioning without binding or interfering in any way with its free warping properties or action when subject to heat; a device in which proper positioning of the respective parts is attained; and a device in which tne selecting means may be positioned remote from and at right angles or substantially any other desired position with respect to the therma, sensitive member.

A further object of the invention is to provide a device of the character described which shall be reliable and inexpensive to operate and maintain, and which may be readily and quickly installed and removed.

The foregoing and other objects of the invention, together with their attendant advantages, will be apparent as the invention becomes better understood by reference to the accompanying specification and drawings forming a part thereof, it being premised that changes may be made in the various details and the manner of operation within the scope of the appended claims without departing from the spirit and scope of the invention.

In the drawings:

Figure 3 is a view in front elevation of the temperature regulating mechanism with portions thereof shown in dotted lines and with the oven wall shown in section;

Figure 4 is a fragmentary view partly in side elevation and partly in vertical section of another regulating mechanism embodying my invention;

Figure 5 is a fragmentary view partly in side elevation and partly in vertical section showing another embodiment of my invention;

Figure 6 is a view partly in side elevation and partly in vertical section of still another embodiment of my invention.

Figures 1, 2:
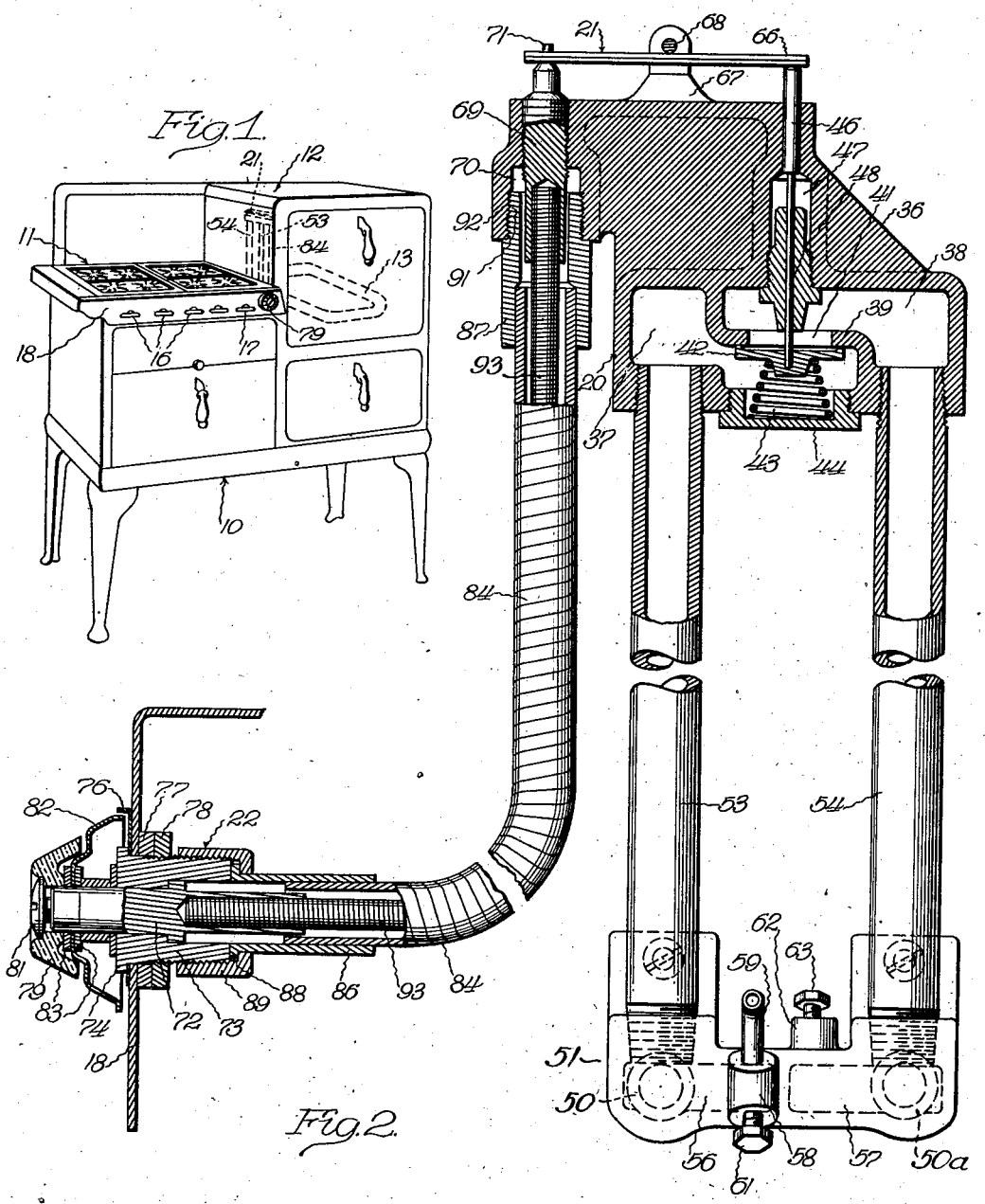
Figure 1 is a view in perspective of a gas range to which an oven temperature regulator is applied in accordance with my invention.
Figure 2 is a view, partly in vertical section and partly in side elevation, of the regulating device shown in Figure 1.

Referring now to the drawings for a more complete disclosure of a heat regulator mechanism and control system embodying my invention and particularly to Figures 1, 2 and 3, there is shown at 10, generally, a gas stove or range in which a portion 11 of the range is utilized for burners of the open type and another portion of the range is used for an oven 12 in which one or more burners 13 are located. On constructing the range the oven may be placed at the right hand or left hand side thereof, or otherwise, as desired.

The range or other heating device may be of any desired style. In the present instance, however, I have illustrated my invention as applied to the "cabinet" type of range in which the control valves 16 for the top burners of the stove and the valve 17 for the oven burner are located or mounted upon a panel 18 at the front of the stove in order that the valves, mixing chambers and piping may be covered.

My heat regulator mechanism comprises, in this preferred embodiment, essentially of three parts, a heat control device 20; a thermal sensitive device preferably located at a distance from the heat control device 20 and in a position where it is exposed to the heat from the oven; selecting or a regulating device 22 adapted to regulate the thermal sensitive element and the control device therethrough, and preferably located at a distance therefrom, with means for connecting the respective devices.

The thermal sensitive device 21 may be located in any desired position or location but in the present embodiment of the invention is preferably within the outer wall 30a of the oven, a suitable inwardly opening recess 30 being provided by bending the inner wall 30d inwardly about the temperature responsive device so that the thermal sensitive device is exposed to the heat of the oven. By mounting the device in this position it is out of the way, does not interfere with the use of the oven, and is in position indicative of the prevailing temperature, therein. In other words, the thermostat is thereby located in a position where it will truly reflect the oven temperature.

The thermal sensitive device 21 is adapted to regulate the heat control device 20 which is preferably located at the lower end of the oven below the level of the top burners of the stove and in a position where it may readily be connected to the heating means or its supply, in the illustrated embodiment the main gas supply manifold. If desired, however, the control device may be located adjacent the thermal sensitive device as illustrated in the embodiment shown in Figures 2 and 3.

A suitable location for the selecting or regulating device 22, from the standpoint of utility of operation, is in a position on the panel 18. It is very desirable, particularly if enameled sheet material is used for the stove construction, that no openings be made in the outer wall of the oven. If the parts of the temperature control device project outside of the oven above the stove, they are not only unsightly but may interfere with the operation of the range.

I have therefore conceived of a heat regulator device which utilizes a flexible connection between the thermal sensitive device and the selecting or regulating mechanism, which flexible connection may be lead around corners to practically any desired position, and is, therefore, well adapted to extend within the wall of the oven above the level of the stove, and lead out of the oven wall at a point below the level of the top of the stove and to the selecting or regulating mechanism 22.

The thermal sensitive member, the heat control device, the selecting device, and the connecting mechanisms are especially constructed in order that the system will transfer the action or regulating movements of the selecting device to the heat or fuel flow control device to properly regulate the gas supply to the oven burner in accordance with the temperature of the oven, and without objectionable variations.

A preferred embodiment of my invention is shown in Figures 1 to 3, inclusive. In this embodiment of my invention a housing 36 is provided which is relatively flat in proportion to its width. The lower portion of the housing 36 is recessed to provide two chambers 37 and 38 with a dividing wall 39 therebetween. A circular opening 41 is provided in the wall 39 and the opening may be closed by means of a valve 42 of the "mushroom" variety. The valve 42 is normally held in a closed position by means of a spring 43 which bears against the lower side of the valve and against a cap 44 which is threaded to the housing 36 and closes one end of the chamber 37. A push rod 46 is slidably mounted in the housing 36 and engages the valve 42 so that vertical reciprocation of the push rod in one direction causes opening of the valve, and in the opposite direction permits spring 43 to close the valve. A cylindrical recess 47 is provided in the housing 36 above the valve 41 and the push rod 46 is mounted for reciprocation within a bushing 48 which is threaded into the recess 47, the purpose of the bushing being to seal the joint between the push rod and the housing to prevent the escape of gas.

Gas is brought from the manifold 50, which is used to supply gas to the top burners of the stove, through a suitable fitting 51 (see Figures 2 and 3) which is fastened to the lower portion of the wall 30a adjacent the lower ends of the walls 30a and 30d of the oven as by means of the screws 52. The fitting 51 is provided with a means for engaging the manifold 50 and is suitably channeled to permit gas to flow from the manifold 50 through the fitting and into a conduit 53. Gas from the conduit 53 is conducted into the chamber 37 of the housing 36 inasmuch as the conduit 53 is threaded into the housing. If the valve 42 is open gas will flow from the chamber 37 into the chamber 38 and to a conduit 54. The gas flowing into the conduit 54 is then conducted to the oven heater burner 13. The fitting 51 is provided with chambers 56 and 57 which are in communication respectively with the manifold 50 and the conduit 54. A hollow boss 58 on one portion of the boss 57 is drilled to provide a passageway from the chamber 56 leading to a conduit 59 which is used to furnish gas for an ignition burner or pilot lighter (not shown). The flow of the gas through the conduit 59 is regulated by means of a needle valve 61 for the purpose of regulating the pilot flame at the lighter. Another boss 62 is provided on the fitting 51 and suitable channels lead from the chamber 56 to the chamber 57 through the boss 62 to permit sufficient gas to flow from the chamber 56 into the chamber 57 to supply a sufficient quantity of gas to the burner to keep the burner burning so long as gas is furnished in the manifold 50. The flow of gas directly from the chamber 56 to the chamber 57 is controlled by a needle valve 63.

A bi-metallic strip 66 is loosely pivotally mounted on the housing 36 by means of a fulcrum 68 carried by brackets 67, and the free abutting contacts with the upper ends of stems 46 and 69. The shaft or stem 69 is threaded into a portion of the housing 36 and is provided with a pin 71 which engages in or through a suitable opening in the end of the bi-metallic element 66 to hold it in position. It may readily be understood that turning of the shaft 69 produces vertical movement of the pin 71 and hence vertical movement of the ends of the thermostatic element 66, to in turn produce vertical movement of the push rod 46 and opening and closing movement of the valve 42.

The means for moving or regulating the position of the shaft 69 comprises a shaft 72 which is mounted for rotation in a bushing 73 which is in turn secured to the panel 18 on the front of the stove. A flange 74 is provided on the bushing 73 and the flange engages a pointer 76 which is located between the flange and the panel 18. The bushing 73 is threaded so that it may be fastened to the panel by means of a nut 77 and a lock nut 78. A control knob 79 is secured to the shaft 72 as by means of a screw 81 and a substantially conical dial 82 is secured to the shaft 72 by means of washers 83 beneath the knob 79. A flexible conduit 84 is provided with collars 86 and 87 at either end and the collar 86 is engaged to the bushing 73 by means of a flange 88 on the collar 86 and suitably flanged and threaded coupling sleeve 89. The collar 87 is provided with external threads 91 which engage threads 92 in the housing 36 so as to hold the flexible conduit 84 in place. The turning motion of the shaft 72 is transmitted to the shaft 69 by means of a flexible shaft 93 which is housed within the flexible conduit 84. It is to be understood that only a limited translational movement of the shaft 93 takes place, since the entire range of rotation of the selecting device is less than one revolution, and therefore the translational movement of shaft 93 is less than the pitch of the threads carried by the shaft 69. The shaft 93 is loosely positioned within the conduit 84, and therefore this slight movement may be accommodated for by the looseness of the shaft within the conduit without occasioning any binding action therebetween.

In operation of this device gas is admitted into the manifold 50 by turning on the valve 17. The gas enters chamber 56 and flows upwardly through the conduit 53 and into the chamber 37 and through the boss 58 and the conduit 59 to the lighter. Gas also flows from the chamber 56 through the boss 62 into the chamber 57 and to the oven heater burner through conduit 50a (Figure 2). Suitable indicia 94 are provided on the dial 82 and the dial is rotated by means of the knob 79 until the pointer 76 indicates the number on the dial corresponding to the temperature at which it is desired to maintain the oven. The rotation of the shaft 72 causes rotation of the flexible shaft 93 and consequent rotation of the shaft 69 to produce upward movement of the pin 71. The upward movement of the pin 71 causes corresponding upward movement of that end of the thermostatic element 66 and downward movement of the opposite end about fulcrum 68 to produce downward movement of the push rod 46 and opening of the valve 42 to permit gas to flow from the chamber 37 into the chamber 38 and to the oven burner 13. The quantity of gas admitted through the valve is sufficient to raise the temperature within the oven to the desired extent, but if the temperature is exceeded, the thermal sensitive element, the metal of greatest coefficient of expansion of which is placed on the lower side of the strip 66, is deformed and bowed upwardly to permit upward movement of the push rod 46 and consequent closing movement of the valve 42 under the biasing action of the spring 43. Closing of the valve 42 results in a lessened flow of gas to the burner so that the oven temperature does not increase rapidly, is maintained substantially constant and as determined by the selecting device. A state of equilibrium is reached so that the quantity of gas admitted to the burner is just sufficient to maintain the temperature of the oven at the desired degree. If the temperature of the oven decreases the bi-metallic element 66 straightens or acts oppositely out to a small extent and opens the valve 42 sufficiently to increase the gas flow sufficiently to raise the temperature to the desired value. Whenever the temperature of the oven again becomes higher than desired, the bi-metallic element bows upwardly to permit closing of the valve 42 and consequent decrease of the rate of flow of gas to cause a decrease in the oven temperature to the selected value.

It is apparent that there are other methods of regulating the position of the thermostatic element 66 and in Figures 4 and 5 I have shown other means for securing vertical regulatory movement of the thermostatic element.

In the embodiment of the invention shown in Figure 4 the shaft 72a has threaded engagement with the bushing 73a so that rotation of the control knob 79 produces in and out movement of the shaft. The shaft 69a is slidably engaged for vertical movement within the housing 36a and is biased downwardly by means of a spring 94 which rests against the upper end of the opening 70a and against a suitable flange on the shaft 69a. A flexible rod 93a is secured rigidly at one end to the shaft 72a and at the other end to the shaft 69a so that in and out or reciprocatory movement of the shaft 72a is transmitted to the shaft 69a. The operation of this device is substantially the same as the device shown in Figure 2 except that no rotary motion of the shaft 72a is transmitted to the shaft 69a but only a reciprocatory motion. The shaft 72a thereby becomes the member which initially produces reciprocation by means of the rotary movement which is imparted.

In another embodiment of the invention shown in Figure 5 the construction is substantially the same as that shown in connection with Figures 2 to 4, inclusive, but the shaft 72b extends to a limited degree only into the flexible conduit 84b as does also the shaft 69b. A plurality of ball members 93b are disposed in the conduit 84b and since the ball members are in contact with each other throughout the conduit, reciprocatory movement of the shaft 72b produces a corresponding reciprocatory movement of the shaft 69b to regulate the thermostatic element 66 in substantially the same manner as before.

In the embodiment of the invention shown in Figure 6 substantially the same regulating mechanism is employed as in the embodiment shown in Figures 2 and 3 except that the bushing 73c is inserted through the panel 18 from the back of the panel and is held in place by means of lock nuts 77c and 78c located on the front of the panel. The dial 82c is frictionally held in engagement by the washers 83c corresponding to the washers 83 of Figure 2. The housing 36c is of a different construction inasmuch as in this form gas is not conducted through the housing. The housing 36c serves as a means of supporting a conduit 95 suspended therefrom and in which an elongated push rod 46c is arranged for vertical reciprocation. A valve housing 97 is threaded upon the lower end of the conduit 95 and the valve housing may be bolted to the lower portion of the wall of the oven by means of bolts 96.

The interior of the housing 97 is divided into two chambers 98 and 99 by a wall 101. The chamber 98 is connected with the supply manifold 50 and the chamber 99 is connected with the oven burner 13. An opening 41c through the wall 101 permits gas to flow from the chamber 98 into the chamber 99 and thence to the burner 13 and the rate of flow of the gas through the opening may be controlled by means of the valve 42c which is raised off its seat by the push rods 46c, 46d and is biased toward the seat by the spring 43c. The spring 43c rests against a cap 44c which is threaded into the housing 97 to afford a closure for the chamber 98.

The operation of the device shown in Figure 6 is substantially the same as the operation of the devices previously described but the location of the valve for controlling the flow of fuel to the burner is located in substantially the same horizontal plane with or down near the plane of the manifold which supplies gas to the oven burner and therefore it is unnecessary to carry the gas up within the wall of the oven and back down again in order to reach the oven burner. In this manner the piping necessary for the gas to reach the burner is simplified and minimized.

It is apparent that I have provided an improved means and method of regulating the flow of fuel to a burner in order to regulate the temperature of the space of the burner is adapted to heat and that the different parts of the system are located at the most advantageous position, both from the standpoint of utility and simplicity of structure.

Having thus described my invention I claim:

1. In a temperature control mechanism for gas stoves, a temperature sensitive device located in the oven of the stove, a regulating device located at a distance therefrom, connecting means for connecting the regulating device with the temperature sensitive device to permit regulation thereof, a fuel flow control means located adjacent the temperature sensitive device also within the wall of the oven and means for conducting fuel to and from the fuel flow control means comprising conduits and a fitting located in substantially the same plane with said regulating device and at the bottom of the oven and adapted to provide by-pass means to supply fuel for ignition purposes.

2. The combination with an oven having a burner, of a heat regulator therefor, comprising a housing located within the wall of the oven and in position indicative of the prevailing temperature within the oven, a pair of conduits depending from said housing, a fitting at the lower ends of said conduits including a valve, a gas line connected to said fitting, a conduit extending from said fitting to the oven burner, a thermal sensitive device pivoted on said first housing and having one end thereof controlling said valve, and a selecting device flexibly connected with the opposite end of said thermal sensitive device.

3. The combination with a gas range provided with an oven having a burner, of a heat regulator therefor, comprising a housing located within the wall of the oven and in position indicative of the prevailing temperature within the oven, a pair of conduits depending from said housing, a fitting at the lower ends of said conduits, a gas line connected to said fitting, a conduit extending from said fitting to the oven burner, a thermal sensitive device mounted on said first housing and controlling said valve, a panel in front of the range, a selecting device mounted upon said panel, and a flexible connection between said selecting device and said thermal sensitive device.

HAROLD A. MANTZ.